United States Patent [19]

Bhagavatula

[11] Patent Number: 5,125,946
[45] Date of Patent: Jun. 30, 1992

[54] MANUFACTURING METHOD FOR PLANAR OPTICAL WAVEGUIDES

[75] Inventor: Venkata A. Bhagavatula, Big Flats, N.Y.

[73] Assignee: Corning Incorporated, Corning, N.Y.

[21] Appl. No.: 625,153

[22] Filed: Dec. 10, 1990

[51] Int. Cl.⁵ ............................................. C03B 23/00
[52] U.S. Cl. ...................................... 65/106; 65/112; 65/18.4; 65/42; 65/60.2; 65/64; 65/94; 65/102; 385/129; 156/659.1; 156/663; 427/167
[58] Field of Search ............... 65/18.1, 18.4, 42, 60.1, 65/60.2, 60.5, 64, 94, 102, 106, 112; 156/630, 633, 659.1, 663; 427/166, 167; 264/1.1, 1.7, 2.7, 532; 350/96.12; 385/129, 130, 131, 132

[56] References Cited

U.S. PATENT DOCUMENTS

| | | | |
|---|---|---|---|
| 3,022,541 | 2/1962 | Passley et al. | 264/2.7 |
| 3,663,194 | 5/1972 | Greenstein et al. | 65/43 |
| 3,794,536 | 2/1974 | Muska | 156/11 |
| 3,806,223 | 4/1974 | Keck et al. | 117/45 |
| 3,873,339 | 3/1975 | Hudson | 117/17 |
| 3,934,061 | 1/1976 | Keck et al. | 65/18 |
| 4,425,146 | 1/1984 | Izawa et al. | 65/18.2 |
| 4,504,341 | 3/1985 | Radzwill et al. | 264/1.7 |
| 4,765,702 | 8/1988 | Dohan et al. | 350/96.12 |
| 4,820,141 | 4/1989 | Shingu et al. | 264/532 |
| 4,933,262 | 6/1990 | Beguin | 350/96.12 |

FOREIGN PATENT DOCUMENTS 60-256101 12/1985 Japan .
63-206709 8/1988 Japan .

OTHER PUBLICATIONS

Seki et al., "Two-Step Purely Thermal Ion-Exchange Technique", Electronic Letters, vol. 24, pp. 1258-1259, 1988.
Alferness, "Waveguide Electrooptic Modulators", IEEE Transactions on Microwave Theory, vol. MTT-30, No. 8, Aug. 1988, pp. 1121-1137.
Electronics Letters, Apr. 12, 1984, vol. 20, No. 8; "Optical-Fibre Coupling to High-Silica Channel Waveguides with Fibre-Guilding Grooves".

*Primary Examiner*—Michael G. Wityshyn
*Assistant Examiner*—John J. Bruckner
*Attorney, Agent, or Firm*—K. McNeill Taylor, Jr.

[57] ABSTRACT

A metehod of manufacturing planar optical waveguides in which a planar optical preform which is stretched to form a planar optical cane with substantially smaller cross-sectional dimensions than the original preform, and in which the optical circuitry pattern is achieved by lithographic techniques. Optical fiber preforms may be inserted in slots in a substrate to form the planar optical preform.

29 Claims, 4 Drawing Sheets

MANUFACTURING METHOD FOR PLANAR OPTICAL WAVEGUIDES

BACKGROUND OF THE INVENTION

This invention relates to planar optical waveguides and, in particular, to a hybrid manufacturing method for such waveguides.

Planar optical waveguides are used as passive components in optical inter-connection systems. These waveguides are distinguished from cylindrical dielectric waveguides, e.g. optical fibers, in that they are substantially rectangular in cross-section. Existing methods for manufacturing these waveguides generally are expensive, require tight manufacturing controls, and result in waveguides with optical losses that are relatively high when compared to optical fibers.

Existing methods of producing planar optical waveguides involve the use of substrates having a first refractive index and having the preselected final dimensions of the planar optical waveguide to be formed. Materials having a second refractive index different from that of the substrate are applied to the substrate using various methods, including standard soot deposition techniques which are well-known in the art. (See, e.g. Keck et al. U.S. Pat. Nos. 3,806,223 and 3,934,061.) The preselected refractive index differential is achieved by using silica doped with one or more of the following: titanium oxide, tantalum oxide, tin oxide, niobium oxide, zirconium oxide, aluminum oxide, lanthanum oxide, germanium oxide, or other suitable refractive index modifying dopant materials.

Optical circuitry within these planar waveguides is typically formed by a lithographic process similar to that used in the manufacture of semiconductor devices, as described in Izawa et al. U.S. Pat. No. 4,425,146. Another prior art method is described in Hudson U.S. Pat. No. 3,873,339 wherein a focused laser beam is used to fuse only that material which is to form part of the preselected optical circuitry, and the remaining unfused material is removed by cleaning or etching.

The use of lithographic techniques is wide-spread in the manufacture of semiconductor devices. These techniques are useful because detailed patterns—in the case of the present invention, optical circuit patterns—may be produced.

The lithographic process begins with a structure which contains the necessary materials to produce the desired electrical or optical circuit. This structure is coated with a photo-resistive material. The photo-resistive material is exposed to light through a mask which selectively exposes part of the photo-resistive material. The mask is the image of the desired circuit pattern. The exposed photo-resist is developed in a developing solution designed for the type of photo-resistive material used. The underlying structure is then etched using, for example, reactive ion etching to transfer the mask pattern to the underlying structure.

In the case of producing planar optical waveguides, a coating of alloy material, for example chrome, is typically applied to the underlying structure before the photo-resistive material is applied. This chrome layer is required because the photo-resistive material alone is not, in general, able to withstand the etching conditions necessary to etch the optical circuit into the underlying glass structure. The photo-resistive material is exposed and developed as above and the optical pattern is transferred to the intermediate chrome layer by using a chrome etching solution. Then the optical pattern is transferred to the underlying glass structure using, for example, reactive ion etching.

Each of these existing methods involves the application of very thin layers to form the core region of the waveguide. This core region guides the majority of the light through the waveguide. Small perturbations in the manufacturing process may result in inhomogeneous core structures with optical losses which are very high, particularly relative to the optical fibers which are attached to these planar optical waveguides. Therefore, tight control of the deposition process is required in existing methods to achieve the preselected thickness of the core region. This is particularly the case where the planar optical waveguide is manufactured for use in single-mode systems using fibers with core diameters of 10 μm or less.

The problems inherent in existing methods of producing planar optical waveguides are:

1. optical losses are relatively high compared to those of optical fibers;
2. expensive manufacturing controls are required to keep the optical losses to a minimum; and
3. design and geometries are limited.

It is an object of this invention to produce planar optical waveguides with lower optical losses than those produced by existing methods. A second object is to combine the improved optical performance with the ability to produce mass quantities through the use of lithographic techniques, thereby making the inventive process more cost effective than existing methods. A third object is to provide planar optical waveguides with core layers of various shapes and with various refractive index profiles allowing planar optical waveguides to be used in a wide variety of applications.

SUMMARY OF THE INVENTION

These and other objects are achieved in accordance with the invention, which, in one aspect relates to a process for manufacturing glass blanks used to make optical waveguides by forming a planar fused glass structure with glasses of at least two refractive indices, and reducing the thickness of the structure to produce a planar optical cane of preselected final dimensions.

Another aspect of the invention relates to a process for manufacturing planar optical waveguides by combining a glass substrate with a first refractive index with a second glass region having a different refractive index to form a planar structure, heating and stretching the planar structure to produce a planar optical cane with preselected final dimensions, removing material from the planar optical cane using lithographic techniques to produce preselected optical circuitry thereon, and combining a region of additional material with the cane over at least one area where material has been removed. In one embodiment of the invention, the planar structure is formed by placing at least one optical fiber preform into at least one slot in said glass substrate.

As used herein, the phrase "planar optical cane" refers to a structure produced by stretching a consolidated body having a preselected refractive index profile, such that the cross-sectional dimensions of said consolidated body are reduced and the preselected refractive index profile of said consolidated body is present proportionately in the planar optical cane after said consolidated body is stretched.

DETAILED DESCRIPTION OF THE INVENTION

The drawings are not intended to indicate scale or relative proportions of the elements shown therein.

Figure 1:
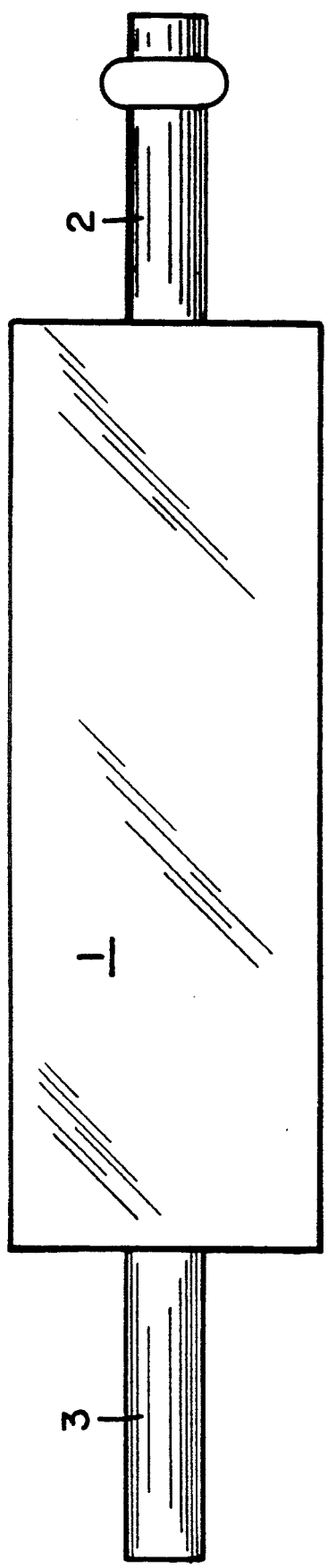
FIG. 1 is an illustration of a substrate with handles attached for support during processing.

The present invention uses a hybrid process for the manufacture of planar optical waveguides. The process begins with a substrate 1 as shown in FIG. 1. The substrate is essentially planar with dimensions substantially greater than those desired for the final planar optical waveguide. The material of the substrate is selected to match the thermal and mechanical properties of the materials used as waveguide conductors and films. Typically, the substrate will be made essentially of silica. However, with waveguide conductor materials containing some of the fluoride compositions, it is possible to use borosilicate or soda lime glass as the substrate material. Handles 2 and 3 may be attached to facilitate handling during the manufacturing process.

Figure 2:
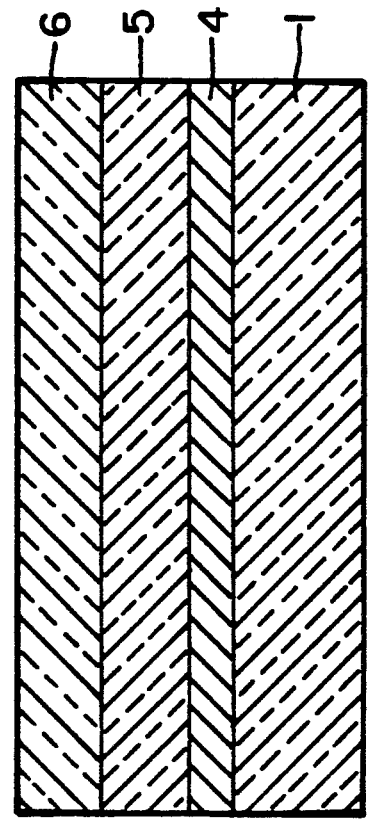

The next step in the process is the application to a surface of the substrate of one or more layers of material having a refractive index different from that of the substrate. The preselected refractive index differential typically is achieved by using silica doped with one or more of the following: titanium oxide, tantalum oxide, tin oxide, niobium oxide, zirconium oxide, aluminum oxide, lanthanum oxide, germanium oxide, fluorine, or other suitable refractive index modifying dopant material. Dopants for other purposes may also be used, for example erbium or neodymium for amplification of an optical signal. In addition, other compositions such as fluoride glasses may be used, and substrates may be formed from Pyrex glass, soda lime glass, etc., to match the thermal and mechanical properties of the waveguide conductor materials. The soot may be applied using standard soot generation techniques and may be applied on only one side or, by rotating the substrate, on all sides. The layers of material so applied preferably consist of a barrier layer 4, core layer 5, and clad layer 6 as shown in FIG. 2.

Other techniques may be used to apply the material layers on the substrate, such as plasma-enhanced CVD, sol gel, low pressure CVD or sputtering.

Whether barrier layer 4 is used depends on the refractive index and loss characteristics of the substrate 1. If the refractive index differential between substrate 1 and core layer 5 is too small, the material of the barrier layer 4 is selected such that the refractive index differential between the barrier layer and the core layer is sufficient to channel the majority of the light incident on the resulting planar optical waveguide through core layer 5. The refractive index of clad layer 6 is also selected to enable efficient waveguide propagation through core layer 5.

Figure 10A:
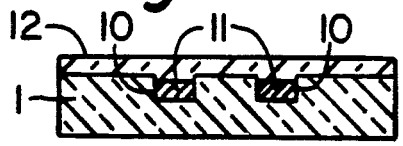
FIGS. 10(a) and 10(b) depict an alternative embodiment of the invention.

Another method for this application step is the use of sol-gel or slurry casting techniques to place applied material 11 in dimensional slots 10 cut into the surface of substrate 1 as shown in FIG. 10(a). The dimensional slots are cut in the surface of the substrate using lithographic techniques or a dicing saw, depending for example, on the size of the slots.

Figure 3:
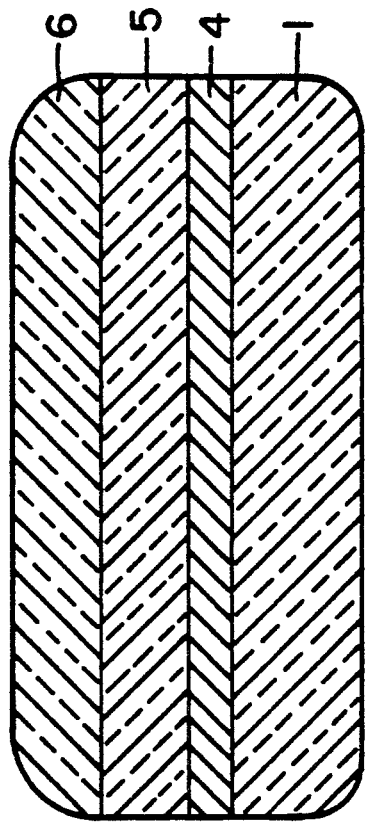
FIGS. 2-8 are cross-sectional views of a planar optical waveguide in various stages of manufacture in accordance with the invention.

After the material is applied, the structure is heated in a furnace to fuse the refractive index producing material and provide a planar optical preform. This fusing process should preferably occur quickly to reduce the diffusion of dopants in the various layers of soot. This fusion step may be performed in a chlorine atmosphere if it is desirable to dehydrate the soot layers. An example of this dehydration process is described in more detail in U.S. Pat. No. 4,165,223 issued to D. R. Powers. The fused structure is then heated to the softening point and stretched to produce a planar optical cane of the preselected end dimensions. The reduction ratios typically involved are 50:1 or less, with a preferred range of 10:1 to 20:1. The softening temperatures and the aspect ratio (i.e., width to height) of the fused structure should be chosen so as to avoid geometric distortion during the reduction step. Rounded corners, as shown in FIG. 3, may be used instead of sharp features to reduce the geometric distortion.

Figure 4:
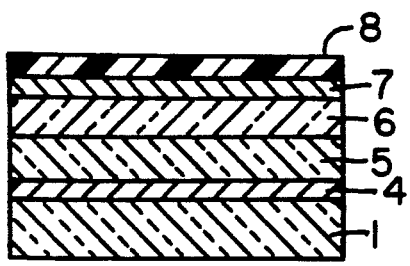
Figure 5:
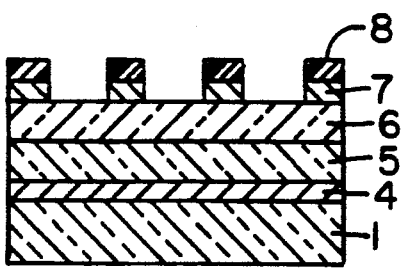
Figure 6:
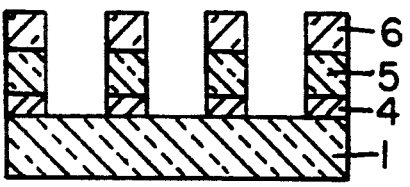

The preselected optical circuitry is then produced on the planar optical cane using lithographic techniques. A metal or alloy coating material 7 and an organic photo-resist coating 8, shown in FIG. 4, are applied to the planar optical cane. Thereafter, a master mask is aligned over the planar optical cane, and the pattern of the master mask is transferred to the organic photo-resist coating by conventional photo-lithographic techniques. The exposed organic photo-resist coating is removed by washing the planar optical cane in developing solution, and the alloy coating in these exposed areas is removed using a commercial chrome etch solution. After these coatings are removed, the only coatings remaining on the planar optical cane are in the pattern of the master mask, for example as shown in FIG. 5. Any remaining organic photo-resist material is removed by washing in acetone. The pattern is then transferred onto the planar optical cane, for example as shown in FIG. 6, by reactive ion etching.

Figure 9:
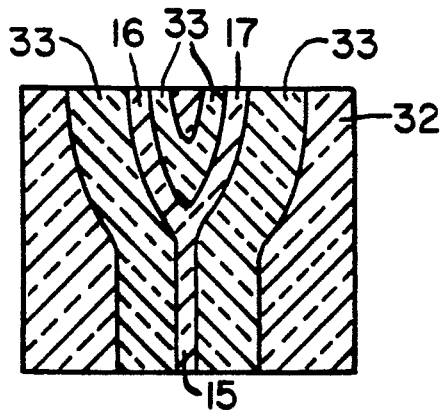
FIG. 9 depicts an example of an optical circuit pattern of a type of planar optical waveguide made in accordance with the invention.

In one embodiment of the invention, as depicted in FIG. 9, the etching step is carried out such that, after etching has been completed to remove the unwanted portions of said second glass, relatively wide portions 32 of the unetched cane remain at the lateral edges of the planar optical waveguide. In a preferred embodiment of the invention, etching is carried out to remove 15-30 μm wide trenches 33 adjacent the waveguide paths 15, 16 and 17. These portions help to protect the preselected optical circuitry from physical damage during further processing.

Figure 7:
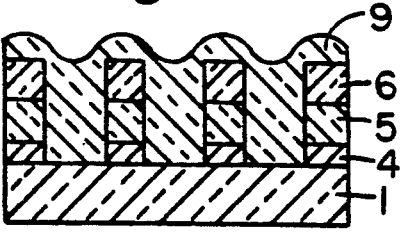

Any remaining alloy coating is removed using a commercial chrome etch solution. An overclad layer 9, for example as shown in FIG. 7, is applied to the planar optical waveguide using conventional soot deposition techniques or other thin film technologies such as plasma-enhanced CVD, sol-gel, low pressure CVD or sputtering.

In a preferred embodiment, the substrate is a fused silica slab with a refractive index of 1.458 and initial dimensions of ½ inch thick by 2 inches wide by 14 inches long (1.27 cm thick by 5.08 cm wide by 35.56 cm long). The substrate is shaped and ground to essentially a rectangular cross-section using conventional glass grinding techniques. Handles 2 and 3 (FIG. 1), made for example of T08 (commercial grade silica) rod, are attached to the substrate by fusing the handles to the substrate under open flame. These handles allow the substrate to be mounted in a glass-working lathe.

The glass-working lathe is equipped with burners to carry out a flame hydrolysis/oxidation process similar to that described in U.S. Pat. No. 2,272,342 issued to J. F. Hyde and U.S. Pat. No. 2,326,059 issued to M. E. Nordberg. Conventional vaporizer or bubbler equipment is used to deliver the chemical reactants to the burner (see, Blankenship U.S. Pat. No. 4,314,837 and Schultz U.S. Pat. No. 3,826,560). The burner is similar to that described in Moltzan U.S. Pat. No. 3,698,936; a discussion of the temperature characteristics of the flame produced by such burners may be found in M. Elder and D. Powers, "Profiling of Optical Waveguide Flames", *Technical Digest for the* 1986 *Conference on Optical Fiber Communication*, Atlanta, Ga., page 74, 1986.

Figure 8:
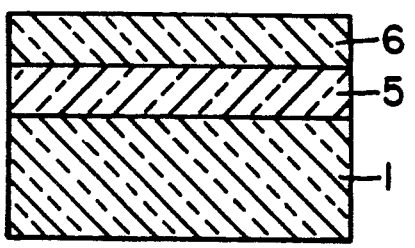

A barrier layer 4, as shown in FIGS. 2-7, is not required because the substrate is fused silica and has the necessary refractive index in relation to the refractive index of the core layer 5. A cross-section of the cane used in this example, without a barrier layer, is shown in FIG. 8. References to FIGS. 2-7 in describing the lithographic process used in this example will be made for convenience only, as FIGS. 2-7 show a barrier layer which is not present in this example. A core layer 5 (FIG. 8) approximately 100 μm thick, consisting of $SiO_2$ and 8% by weight $GeO_2$, with a refractive index of approximately 1.464, is applied to the substrate. Thereafter a clad layer 6 of pure silica soot approximately 100 μm thick is applied over the core layer.

The resulting structure is placed in a furnace at a temperature of approximately 1540 degrees C. for approximately 20 minutes to fuse the core and clad layers.

The fused structure is then placed in a vertical furnace and heated to approximately 2100 degrees C. This second furnace is equipped with gripping and pulling mechanisms which stretch the fused structure. The fused structure is lowered into a hot zone in the furnace which raises the temperature of the fused structure to the softening point. The pulling mechanism then stretches the fused structure by pulling the bottom of the structure out of the hot zone of the furnace at a rate which is faster than the rate at which the fused structure is being lowered into the hot zone. The fused structure is thereby stretched such that its length is increased while its width and thickness are decreased. The planar optical cane thus produced is approximately 0.16 inches wide, 0.04 inches thick, and 30 inches in length (about 0.4 cm wide, 0.006 cm thick, and 76.2 cm in length). The resulting thickness of the core layer of glass is 6-8 μm. In another embodiment, the core layer may be 8-9 μm thick. The number of individual planar optical devices which can be produced from one planar optical cane is dependent on the type of device to be produced. For example, a 3 dB splitter, as shown in FIG. 9, is approximately 1 inch (2.54 cm) in length; therefore, one planar optical cane with stretched width corresponding to the device width would yield approximately 30 such devices.

The planar optical cane is repeatedly cleaned in a solution of de-ionized water, acetone and 1-2% HF. A chrome coating 7, such as Chrome Target made by Materials Research Corporation, located in Orangeburg, N.Y. 10962 approximately 2000 Angstroms thick is applied to the planar optical cane using RF-sputtering techniques. Thereafter, organic photo-resist coating 8, such as S1400-17 made by the Shipley Company, located in Newton, Mass., is spin coated on the chrome surface at 3000 rpm. The coated planar optical cane is then baked in an oven at 110 degrees C. for 20 minutes.

Using conventional techniques, a master optical circuitry mask is prepared with the preselected optical circuitry pattern. An example of such an optical circuit pattern is depicted in FIG. 9. The optical pattern of this example results in a device known as a 3 dB splitter. Light enters the device at input 15. Part of the light exits at output 16 and part at output 17.

In one embodiment of the present invention, the coated planar optical cane is fed into a lithography machine. The machine aligns the cane with the master optical circuitry mask and exposes the organic photo-resist coating to ultraviolet light. The preselected optical circuitry pattern is thereby transferred to the organic photo-resist coating. The pattern is developed in the organic photo-resist coating using photo-resist developer, such as Microposit 352 developer made by the Shipley Company, located in Newton, Mass. The coated cane is rinsed in de-ionized water and dried. Also, the exposed positive organic photo-resist coating is removed during this step.

The chrome coating at the exposed areas of the planar optical cane is removed using a commercial chrome etch solution, such as Chrome Etch made by KTI Chemicals, Inc., located in Sunnyvale, Calif. Thereafter, the remaining organic photo-resist coating is removed by washing the planar optical cane in acetone, rinsing in de-ionized water and drying. As a result, the planar optical cane has chrome coating in the pattern of the preselected optical circuitry.

The unprotected glass portions of the planar optical cane are then etched using a reactive ion technique. The remaining chrome coating is removed using a commercial chrome etch solution. The planar optical cane is then scrubbed in a solution of de-ionized water, commercial glass cleaner and 1-2% HF, rinsed in de-ionized water and dried.

Thereafter, at least approximately 15 μm of overclad layer 9 (FIG. 7) is applied over the optical circuitry by conventional soot deposition techniques. If passive alignment to pigtail arrays is desired, approximately 62.5 μm of overclad layer 9 should be applied. The overclad layer is silica doped with approximately 8% by weight of $B_2O_3$ to reduce the fusing temperature and doped with approximately 1% by weight $GeO_2$ to result in a refractive index of approximately 1.458. To form waveguides other than for single mode operation at 1.3-1.55 μm, the dopant levels should be adjusted appropriately. This cladding material is fused to the planar optical waveguide at a temperature of approximately 1320 degrees C. for approximately 20 minutes to assure that the cladding layer covers the optical circuitry without leaving any voids.

Planar optical waveguides made from the inventive process have shown improved optical performance.

Attenuations, including coupling losses induced during the measurement, have been measured as low as 0.02 dB/cm. After accounting for the theoretical coupling losses attributable to the measurement equipment, the calculated attenuations of some of the planar optical waveguides produced by the inventive process are less than 0.01 dB/cm. This compares to attenuations of 0.05-0.1 dB/cm with prior art processes. This substantial attenuation reduction is believed to result from the smoothing and size reduction of defects during redraw.

One alternative embodiment of the invention is the combination of more than one planar optical device in the optical circuitry pattern. Another alternative embodiment is the processing of a series of planar optical devices by successively exposing portions of coated planar optical canes using a master lithographic pattern.

Figure 14A:
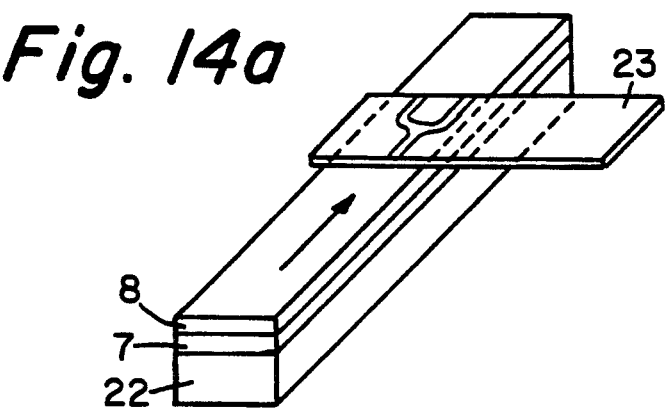
FIGS. 14(a) and 14(b) depict another alternative embodiment of the invention.
Figure 14B:
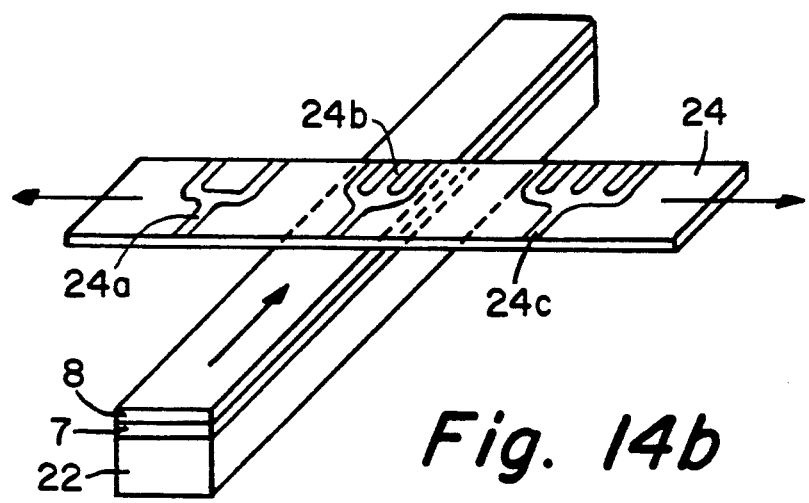

Another alternative embodiment is the processing of longer length planar optical canes by feeding the cane into a device which will successively expose areas of this cane to preselected optical circuitry master masks. This is illustrated in FIG. 14(a) where a longer planar optical cane 22, coated with a chrome coating 7 and an organic photo-resist coating 8, is moved into a machine which aligns successive areas of said longer planar optical cane 22 to master mask 23 for exposure. This exposed longer planar optical cane 22 is then etched as previously described and cut into individual planar optical waveguides. Alternatively, a plurality of master masks 24, shown in FIG. 14(b), each producing a distinct optical circuit pattern, 24a, 24b, and 24c, may be indexed into position over said longer planar optical cane 22 as said longer planar optical cane is moved into the exposing position. In this manner, one longer planar optical cane 22 may be used to produce several different types of planar optical waveguides.

Figure 10B:
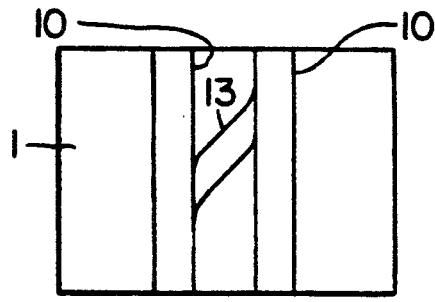

Yet another alternative method of forming the preselected refractive index profile is to etch precise dimensional slots 10 in the unstretched substrate 1 which correspond to the preselected optical circuitry pattern and fill those slots with materials 11 as shown in FIG. 10(a) using either soot deposition, sol-gel or slurry casting techniques. The refractive index of materials 11 is different from the refractive index of the substrate. A cross-connect layer 12 may be applied using soot deposition techniques previously described. The resulting structure is fused and stretched as above. The fused structure is etched, as above, as necessary to further define the preselected optical circuitry pattern. In particular, regions of cross-connect layer 12 may be removed, leaving cross-connect channel 13 as depicted in FIG. 10b.

Figure 11A:
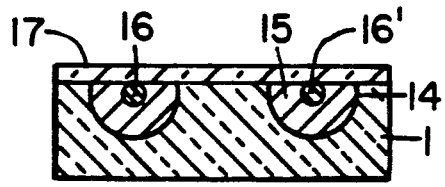
FIGS. 11(a), 11(b), 11(c), 12 and 13 depict another alternative embodiment of the invention.

Another alternative is to etch precise dimensional slots 14 in substrate 1 which correspond to the preselected optical circuitry shown in FIG. 11(a). Thereafter at least one shaped (e.g., circular, square, elliptical or D-shaped) optical fiber preform or large core optical fiber 15 (hereinafter optical fiber preform 15) with core regions 16, 16' having the desired refractive index profile (e.g., step or graded) is placed in at least one of slots 14. The optical fiber preform may alternatively consist of a core only. In addition, stress inducing materials or members may be included to provide stress birefringence.

In FIG. 11(a), optical fiber preform 15 has been ground to expose core region 16. Optical fiber preform 15 is placed on the substrate such that its optical axis is parallel to the stretch axis of the substrate.

In an alternative embodiment, the optical fiber preform may be placed on a planar substrate without slots, and overcoated. Alignment projections or grooves may be included in the cane to assist in fiber positioning. The shape of the optical fiber preform is chosen based on the anticipated changes during stretching. For example, circular cores may be transformed into elliptical cores. The shape transformation may be controlled to some extent by limiting the soot thickness and also by using shaped blanks with stiff claddings.

Figure 11B:
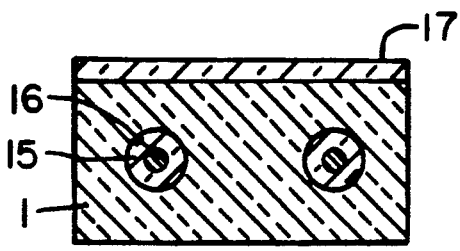

A cross-connect layer 17 of proper refractive index is placed over optical fiber preform 15 and fused as described previously. The cross-connect layer 17 may be in contact with the surface optical fiber preform 15 as shown in FIG. 11(a) or may be a predetermined distance above optical fiber preform 15 as shown in FIG. 11(b). A protective overclad layer 18 may be applied over the cross-connect sol-gel or slurry casting techniques. This protective layer reduces the contamination and/or diffusion of the dopant material during consolidation.

Figure 11C:
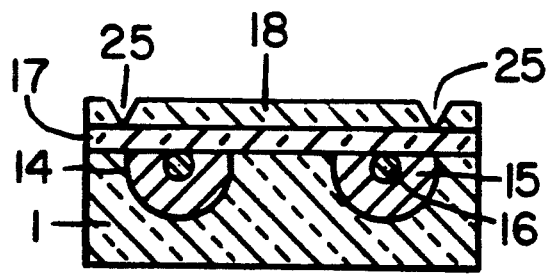

The resulting structure is fused as previously described. The fused structure is then stretched and etched as described above to further define the preselected optical circuitry pattern. Alignment grooves 25, as shown in FIG. 11(c), may be used to align the master mask precisely relative to the embedded canes or fibers for proper cross-connection. Alignment projections may be used instead of grooves 25.

Figure 12:
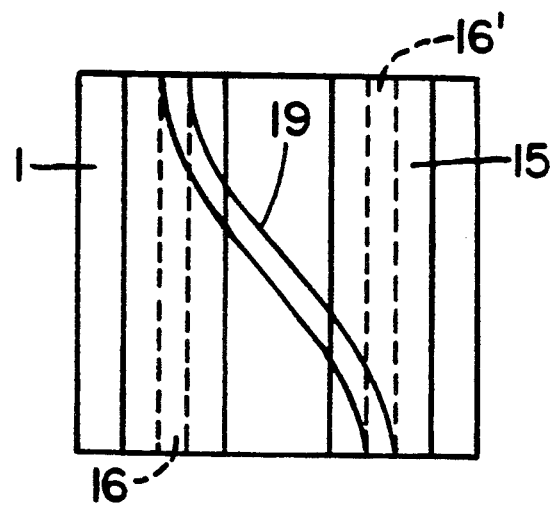
Figure 13:
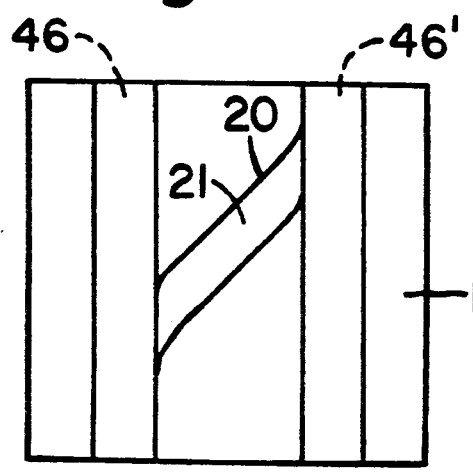

An example of a simple branching cross-connect is shown in FIG. 12 where the branching circuitry 19 is formed by etching the cross-connect layer 17 of FIG. 11(b) after the stretching operation to leave cross-connect circuit 19 between waveguide cores 16 and 16'. Another method of forming the cross-connect between waveguide conductors 46 and 46' embedded in the substrate is to etch cross-connect channels 20 as shown in FIG. 13. Thereafter, these channels are filled with materials 21 having refractive index suitable for the required optical inter-connection, using soot deposition, sol-gel or slurry casting techniques. In the embodiments of both FIGS. 12 and 13, the waveguide conductors and cross-connect circuitry are overcoated with glass and form a solid waveguide structure.

Figure 15:
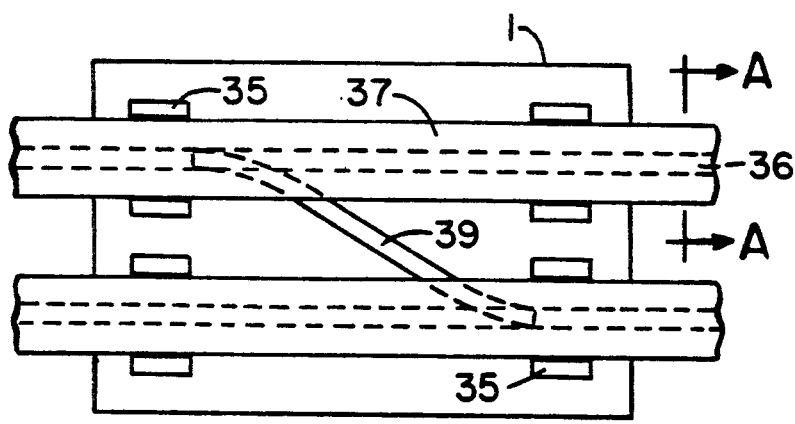
FIGS. 15, 16(a) and 16(b) depict another alternative embodiment of the invention.
Figure 16A:
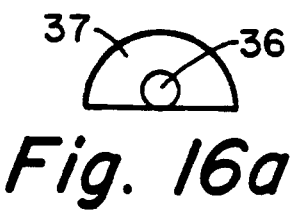
Figure 16B:

In yet another embodiment, planar optical canes (after stretching) including a core layer, or a core layer plus a predetermined thickness of cladding layer, are etched as indicated in FIG. 15 to provide cross-connect patterns in the core layer. The cross-connect patterns are raised approximately 8 microns from the surface of the substrate. Optical fibers with core 36 and cladding 37 are placed with core side contacting the raised cross-connect circuit 39. Sectional views of two such optical fibers along line A-A of FIG. 15 are provided in FIGS. 16a and 16b. Alignment may be facilitated with alignment projections 35 formed in the cane. Alternatively, alignment grooves may be used to mate with corresponding projections in a fiber positioning means. The optical fibers are then held in place permanently with low index epoxy or plasma-enhanced CVD so that they rest on the raised cross-connect circuit. Thereafter, the cane and fiber assembly may be overcoated with glass by conventional means to form a solid waveguide structure with pigtails. By placing the optical fibers in the structure after the stretching operation, the fibers may be used as pigtails or for the attachment of pigtails by splicing.

The present invention has been particularly shown and described with reference to the preferred embodiments thereof. However, it will be understood by those skilled in the art that various changes may be made in the form and details of these embodiments without departing from the true spirit and scope of the invention as defined by the following claims. For example, although the invention has been described herein primarily with reference to single mode waveguide structures, it may also be applied to multimode waveguide structures, with appropriate changes to dopant levels and dimensions.

What is claimed is:

1. A process for manufacturing glass blanks used to make planar optical waveguides, comprising:
   a. forming a planar fused glass structure comprised of a first glass having a first refractive index and at least a second glass having a second refractive index which is different from said first refractive index; and
   b. reducing the thickness of said structure, by stretching said structure, to produce a planar optical can of preselected final dimensions.

2. The process of claim 1 wherein soot deposition techniques are used to apply said at least a second glass on at least one side of said first glass.

3. The process of claim 1 wherein soot deposition techniques are used to apply said at least a second glass in dimensional slots in said first glass.

4. The process of claim 1 wherein said at least a second glass comprises at least one optical fiber preform which is placed into at least one slot in said first glass.

5. The process of claim 4 wherein after said at least one optical fiber preform is placed into said at least one slot, a cross-connect layer is applied.

6. The process of claim 4 wherein said at least one optical fiber preform comprises at least one optical fiber, with a core diameter that is a substantial fraction of the diameter of said optical fiber, which is placed into at least one slot in said first glass.

7. The process of claim 6 wherein after said at least one optical fiber preform is placed into said at least one slot, a cross-connect layer is applied.

8. The process of claim 1 wherein the aspect ratio of said fused structure is selected to avoid geometric distortion during said thickness reducing step.

9. The process of claim 1 wherein the edges of said fused structure are rounded to reduce geometric distortion during said thickness reducing step.

10. The process of claim 1 wherein the reduction in cross-sectional dimensions during said thickness reducing step is within the range of 10:1 to 20:1.

11. The process of claim 1 wherein said at least a second glass comprises a layer initially at least 100 μm thick and wherein said layer is reduced in thickness to approximately 6–8 μm during said thickness reducing step.

12. A process for manufacturing planar optical waveguides, comprising:
   a. forming a planar structure by combining a glass substrate having a first refractive index with at least one region of a second glass having a second refractive index which is different from said first refractive index;
   b. heating and stretching said structure to produce a planar optical cane with preselected final dimensions;
   c. removing material from at least one portion of said planar optical can using lithographic techniques to produce preselected optical circuitry thereon; and
   d. combining a region of additional material with said at least one cane portion over at least one area where material has been removed.

13. The process of claim 12 wherein soot deposition techniques are used to apply said at least one region of a second glass on at least one side of said glass substrate.

14. The process of claim 12 wherein soot deposition techniques are used to apply said at least one region of a second glass in dimensional slots in said glass substrate.

15. The process of claim 12 wherein said at least one region of a second glass comprises at least one optical fiber preform which is placed into at least one slot in said glass substrate.

16. The process of claim 15 wherein after said at least one optical fiber preform is placed into said at least one slot, a cross-connect layer is applied, and wherein said removing step further comprises removing portions of said cross-connect layer to leave a crossconnect pattern.

17. The process of claim 15 wherein said at least one optical fiber preform comprises at least one optical fiber with a core diameter that is a substantial fraction of the diameter of said optical fiber which is placed into at least one slot in said glass substrate.

18. The process of claim 17 wherein after said at least one optical fiber preform is placed into said at least one slot, a cross-connect layer is applied, and wherein said removing step further comprises removing portions of said cross-connect layer to leave a cross-connect pattern.

19. The process of claim 12 wherein the aspect ratio of said planar structure is selected to avoid geometric distortion during the stretching step.

20. The process of claim 12 wherein the temperature at which said planar structure is stretched is chosen so as to avoid geometric distortion during the stretching step.

21. The process of claim 12 wherein the edges of said planar structure are rounded to reduce geometric distortion during the stretching step.

22. The process of claim 12 wherein the reduction in cross-sectional dimensions during said stretching step is within the range of 10:1 to 20:1.

23. The process of claim 12 wherein said at least one second glass comprises layer initially at least 100 μm thick and wherein said layer is reduced in thickness to approximately 6-μm during said stretching step.

24. The process of claim 12 wherein said step of combining a region of additional material comprises applying an overclad layer by soot deposition or other chemical vapor deposition techniques to said planar optical can, said process further comprising the step of fusing said overclad layer, wherein the composition of said overclad layer is preselected so that after fusing, the cladding layer covers without voids the at least one region where material has been removed.

25. The process of claim 12 further comprising the step of cutting said planar optical can into a plurality of pieces before said removing step and wherein said pieces comprise said portions of said planar optical cane.

26. The process of claim 12 further comprising the step of cutting said planar optical cane into a plurality of pieces after said removing step.

27. The process of claim 12 wherein said step of combining a region of additional material comprises placing at least one optical fiber in contact with said at least one cane portion in communication with said preselected optical circuitry to form an assembly.

28. The process of claim 27 wherein said removing step further comprises the creation of alignment means to assist in positioning said optical fibers.

29. The process of claim 27 further comprising overcoating with glass the assembly of said at least one optical fiber and said at least one cane portion.

* * * * *

UNITED STATES PATENT AND TRADEMARK OFFICE
CERTIFICATE OF CORRECTION

PATENT NO. : 5,125,946

DATED : June 30, 1992

INVENTOR(S) : Venkata A. Bhagavatula

It is certified that error appears in the above-identified patent and that said Letters Patent is hereby corrected as shown below:

ON THE TITLE PAGE:
ABSTRACT, line 1, change "metehod" to --method--

Col. 8, line 18, insert after cross-connect --layer 17 as shown in FIG. 11(c), using soot deposition,--

Col. 9, line 22, change "can" to --cane--

Col. 10, line 2, change "can" to --cane--

Col. 10, line 56, change "can" to --cane--

Col. 10, line 62, change "can" to --cane--

Signed and Sealed this

Tenth Day of August, 1993

Attest:

MICHAEL K. KIRK

Attesting Officer

Acting Commissioner of Patents and Trademarks